United States Patent
Deller et al.

(10) Patent No.: US 8,193,748 B2
(45) Date of Patent: Jun. 5, 2012

(54) INTEGRATED BRUSHLESS DC MOTOR AND CONTROLLER

(75) Inventors: Robert W. Deller, Valencia, CA (US);
Robert C. Heagey, Canyon Country, CA (US)

(73) Assignee: SMI Holdings, Inc., Valencia, CA (US)

(*) Notice: Subject to any disclaimer, the term of this patent is extended or adjusted under 35 U.S.C. 154(b) by 564 days.

(21) Appl. No.: 12/249,128

(22) Filed: Oct. 10, 2008

(65) Prior Publication Data
US 2010/0090633 A1 Apr. 15, 2010

(51) Int. Cl.
*H02P 6/16* (2006.01)

(52) U.S. Cl. ............ 318/400.04; 318/615; 318/628; 318/560; 318/400.38; 310/68 R; 310/68 B; 310/156.08; 324/173; 324/174; 361/146; 361/148

(58) Field of Classification Search .......... 318/400.01, 318/400.04, 603, 615, 628, 629, 560, 700, 318/400.41, 400.38; 310/68, 156.01, 156.08, 310/162, 68 R, 68 B; 324/163, 173, 172, 324/174, 175; 361/239, 146, 148
See application file for complete search history.

(56) References Cited

U.S. PATENT DOCUMENTS

| | | | | |
|---|---|---|---|---|
| 3,679,954 A * | 7/1972 | Hedrick | ............ | 318/400.04 |
| 3,809,935 A | 5/1974 | Kristen et al. | | |
| 4,169,990 A * | 10/1979 | Lerdman | ............ | 318/400.41 |
| 4,180,849 A * | 12/1979 | Parkin | ............ | 362/475 |
| 4,479,078 A * | 10/1984 | Kidd et al. | ............ | 318/400.12 |
| 4,779,031 A * | 10/1988 | Arends et al. | ............ | 318/565 |
| 4,827,171 A * | 5/1989 | Bertram et al. | ............ | 310/162 |
| 4,988,905 A * | 1/1991 | Tolmie, Jr. | ............ | 310/68 B |
| 5,006,744 A * | 4/1991 | Archer et al. | ............ | 310/89 |
| 5,038,088 A * | 8/1991 | Arends et al. | ............ | 318/565 |
| 5,159,218 A | 10/1992 | Murry et al. | | |
| 5,327,064 A | 7/1994 | Arakawa et al. | | |
| 5,371,426 A * | 12/1994 | Nagate et al. | ............ | 310/156.49 |
| 5,532,533 A | 7/1996 | Mizutani | | |
| 5,912,541 A | 6/1999 | Bigler et al. | | |
| 5,936,371 A | 8/1999 | Bolash et al. | | |
| 6,078,156 A | 6/2000 | Spurr | | |
| 6,121,747 A | 9/2000 | Trachtenberg | | |
| 6,424,114 B1 * | 7/2002 | Komatsu | ............ | 318/721 |
| 6,791,219 B1 * | 9/2004 | Eric et al. | ............ | 310/68 B |
| 6,823,133 B1 | 11/2004 | Adkins et al. | | |
| 6,892,588 B2 * | 5/2005 | Nagase et al. | ............ | 73/862.326 |
| 7,235,911 B2 * | 6/2007 | Kasahara | ............ | 310/257 |
| 7,332,842 B2 * | 2/2008 | Kasahara et al. | ............ | 310/84 |
| 7,607,437 B2 * | 10/2009 | Boyle et al. | ............ | 128/204.21 |

* cited by examiner

*Primary Examiner* — Rita Leykin

(57) ABSTRACT

An integrated brushless DC motor and controller including a brushless DC motor having a rotating shaft with a 2 pole permanent magnet affixed to the shaft for rotation thereby in a plane orthogonal to the axis of rotation of the shaft. An X-Y Hall Effect Sensor is carried by a controller mounted on a circuit board attached to the motor and the Hall Effect Sensor is positioned proximate the magnet with the Hall Effect Sensor producing the Sine and Cosine components of the magnetic field as the magnet is rotated by the motor shaft. The electronic controller includes software for determining the motor angle and commutation logic from the Sine and Cosine components generated by the Hall Effect Sensor response to the rotating magnetic field. A controller on the board positioned over the rotating shaft contains the highly integrated functions of internal analog digital converters, pulse width modulation registers for driving the power amplifier, internal communication ports and all of the random excess memory and FLASH non-volatile memory that is typically required for motor control.

4 Claims, 16 Drawing Sheets

UNIT CIRCLE – PROJECTION OF FIELD ONTO THE XY PLANE FOR MOTOR ANGLE θ

| STATE | θ MIN | θ MAX | SWA | SWB | SWC |
|---|---|---|---|---|---|
| 1 | 0 | 60 | POS | NEG | |
| 2 | 60 | 120 | POS | | NEG |
| 3 | 120 | 180 | | POS | NEG |
| 4 | 180 | 240 | NEG | POS | |
| 5 | 240 | 300 | NEG | | POS |
| 6 | 300 | 360 | | NEG | POS |

INTEGRATED BRUSHLESS DC MOTOR AND CONTROLLER

FIELD OF THE INVENTION

The present invention relates to the field of Servo Systems which use brushless DC motors for output drive and modern electronics for the system control.

BACKGROUND OF THE INVENTION

DC servo-motors and controllers have a wide variety of application in industry. This combination is commonly used to accurately control the position of an output such as the table on a machine tool or the surface of a fin on a missile. Other common applications include the control of the speed of an output such as a fan or a flow metering pump. The physics and engineering of the basic motor and controller concepts are well known.

As technology and industry progress, the need for greater precision and versatility at lower cost has risen. New controller and sensor technology are enabling the design of new and innovative designs to meet these objectives.

DESCRIPTION OF THE PRIOR ART

Existing design, such as that disclosed in U.S. Pat. No. 5,912,541 use a microprocessor based controller attached to the motor via connectors, through which, the motor is powered and commutation and position are sensed using traditional motor state detecting Hall Effect Sensors and an optical encoder for precise position feedback. This method is effective but requires many connections to attach to the three necessary devices for control. In addition, the position sensing device tends to be very expensive.

U.S. Pat. No. 3,809,935 entitled "Electric Motor Construction", U.S. Pat. No. 4,988,905 entitled "Integrated Driver-Encoder Assembly For Brushless Motor", and U.S. Pat. No. 5,006.744 entitled "Integrated Electronically Commutated Motor and Control Circuit Assembly" are all examples of integrated motor an controller combinations with various unique attributes including interconnecting methods and the use of encoders for positioning.

Controllers that use microprocessors and incorporate programmable performance features including variable gains and operating limits have been around for many years. One such design is given in U.S. Pat. No. 4,779,031. This design includes the microprocessor connected to both non-volatile and volatile memory, data acquisition, elements, and a serial computer interface. A stated objective of this design was to take advantage of the close proximity of the motor and controller to minimize EMI/RF emissions. U.S. Pat. No. 5,159,218 is another example of a controller motor combination that uses classic Hall Effect Sensors for motor commutation. This design uses speed and current feedback to regulate velocity and motor torque.

DETAILED DESCRIPTION

Figure 1:
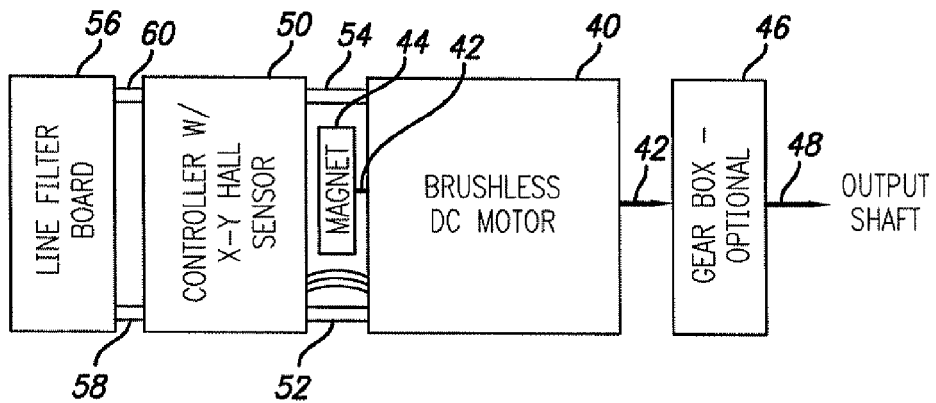
FIG. 1 is schematic block diagram of an integrated motor controller constructed in accordance with the principles of the present invention.

The objective of high performance at a low cost is achieved by attaching the controller to the motor such that two linear and orthogonally fixed Hall Effect Sensors, packaged in a single monolithic integrated circuit and mounted on the controller board, are located proximate a 2 pole magnet that is fixed to the motors rotor shaft. As the rotor turns, the magnet rotates in a plane orthogonal to the axis of the rotor shaft and the two Hall Effect Sensors produce a Sine and a Cosine signal that is decoded in a controller to give a high resolution signal that is proportional to angular position of the motor shaft. This signal is further decoded to produce the motor state information that is necessary for brushless motor commutation. The high resolution position signal is also used for accurate servo positioning. This combination reduces the necessary connections between the motor assembly and the controller to only the three motor phase wires while allowing all of the advantages available to a micro-controller based controller with an electronically commutated brushless DC motor and encoder quality position feedback.

The controller used for this invention is a highly integrated device that includes a microprocessor, FLASH memory for computer program and parameter storage, RAM memory for program execution, Pulse Width Modulation (PWM) drivers, analog to digital converters, and an SCI (Serial Communication Interface) port for easy serial interface to external command and sensor inputs. Within the controller the operating code closes the loops on motor commutation, current, and position, as appropriate to the programmed task. The loop closures are typically done using a classic position error amplifier with adjustable gain followed by a velocity feedback error amplifier with adjustable forward and feedback gain terms as necessary to meet stable system performance requirements. System steady state error is typically improved by use of classic lead-lag compensation. All of the loop closure computations are repeated at a very high rate to support very high bandwidth of the resulting servo control system.

Further enhancements are made in the system software to improve accuracy, reduce electromagnetic emissions, allow a large range of power supply voltage, allow current limiting without a hardware sensor, greatly improve velocity accuracy, and to maximize the computational throughput.

SUMMARY OF THE INVENTION

An integrated brushless DC motor and controller including a brushless DC motor having a rotating shaft, an electronic controller attached to the motor and positioned over the rotating shaft, a two pole permanent magnet affixed to the shaft for rotation by the shaft in a plane orthogonal to the axis of rotation of the shaft, an X-Y Hall Effect Sensor carried by the controller and positioned proximate the magnet, the Hall Effect Sensor producing the Sine and Cosine components of the magnetic field as the magnet is rotated by the motor shaft, the electronic controller includes means for determining the motor angle and commutation logic from the sine and cosine components generated by rotation of the magnet adjacent the Hall Effect Sensor.

Figure 21:
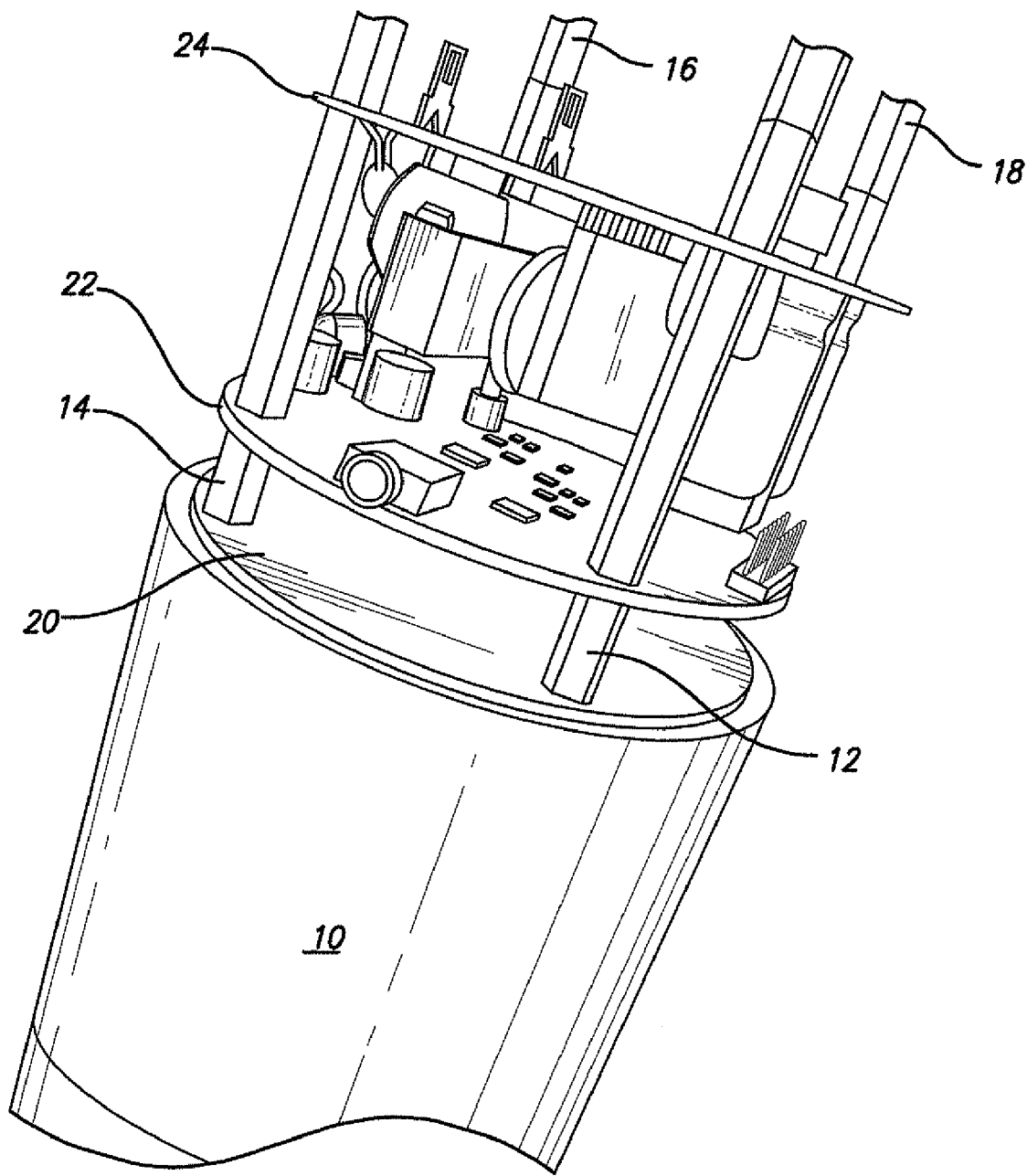
FIG. 21 is a perspective view of the integrated motor and controller in accordance with the present invention with the housing for the controller removed.
Figure 22:
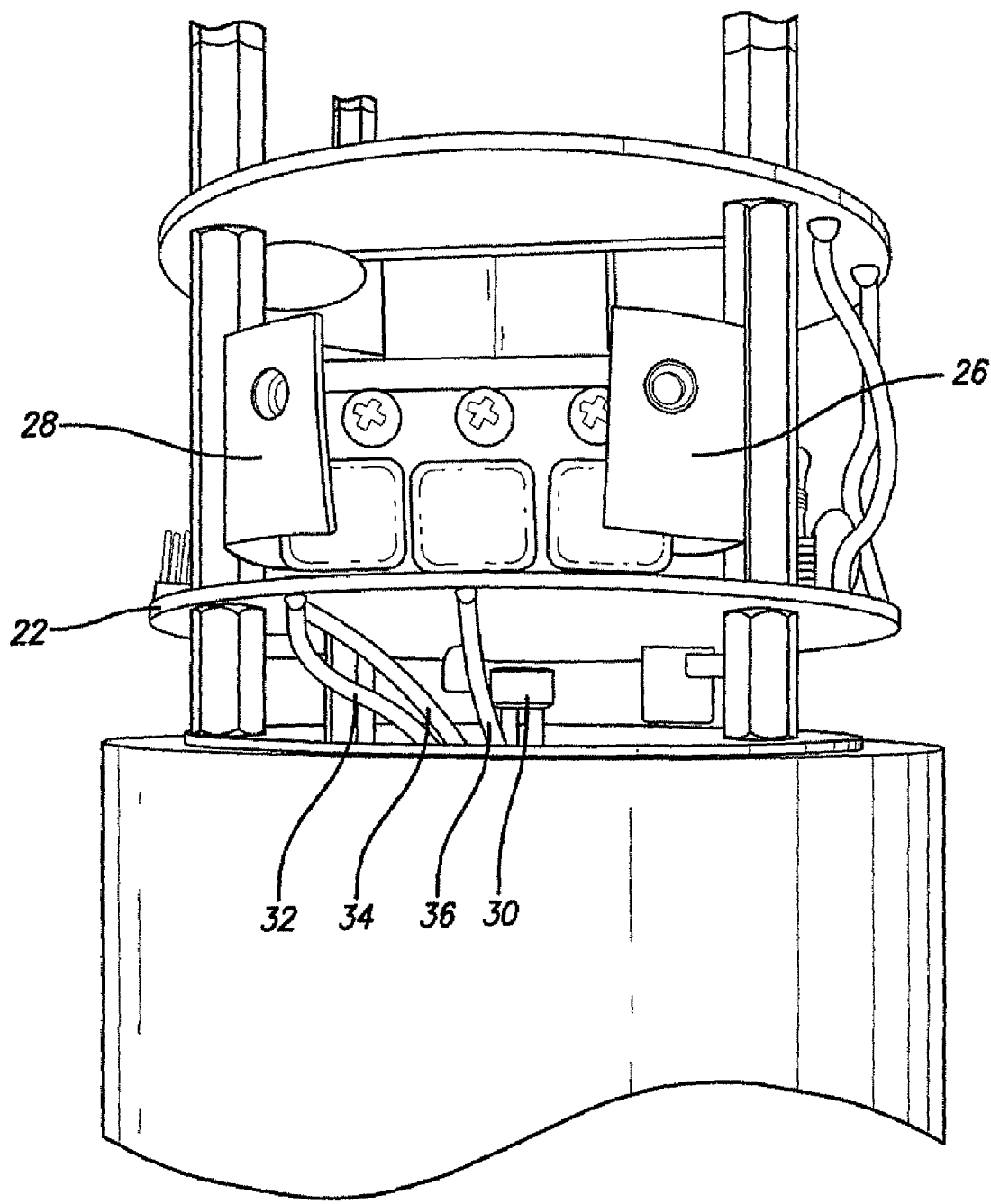
FIG. 22 is a perspective view similar to FIG. 21 but illustrating the controller from a different view.

Referring now more particularly to FIG. 1, there is illustrated in a schematic block diagram the motor and controller combination in accordance with the principles of the present invention. As is therein illustrated there is provided a brushless DC motor 40 which includes a shaft 42 extending from one end thereof. The shaft 42 rotates with the rotor of the motor and has a two pole permanent magnet 44 secured to the end of the shaft 42 by being affixed with adhesive. The magnet is arbitrarily attached to the end of the shaft 42 and as the shaft rotates the magnet rotates in a plane that is orthogonal to the axis of the shaft 42. As is also well known in the art the shaft 42 may also extend from the motor as shown and engage a gear box which is optional as illustrated at 46. The output shaft 48 from the gear box may be then attached to any desired load. The controller 50 is mounted on the circuit board 22 as shown in FIG. 21 and includes an X-Y Hall Effect Sensor which is positioned proximate the magnet 44. It is preferable that the magnet 44 be positioned as nearly as possible to the axis of rotation of the shaft 42 and that the X-Y Hall Effect Sensor be positioned so that it is approximately 0.125±0.025 inches displaced from the magnet 44. It should be noted as shown in FIGS. 21 & 22 that the controller is mechanically affixed to the motor by way of the rods 52 and 54. Also connected to the motor is a power supply 56 which is also mechanically affixed to the motor 40 by the rods 58 and 60 which are effectively an extension of the rods 52 & 54.

Figure 2:
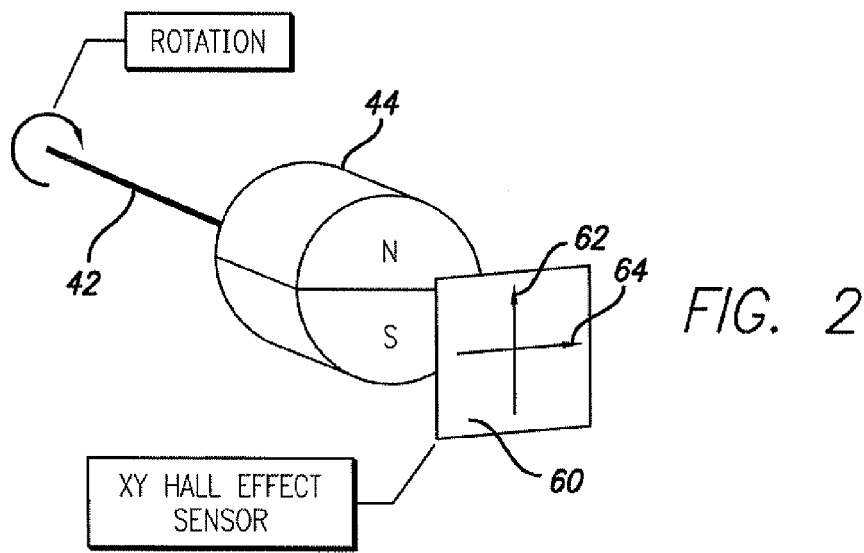
FIG. 2 is a schematic diagram illustrating the magnet and the X-Y Hall Effect Sensor and the output thereof.
Figure 3:
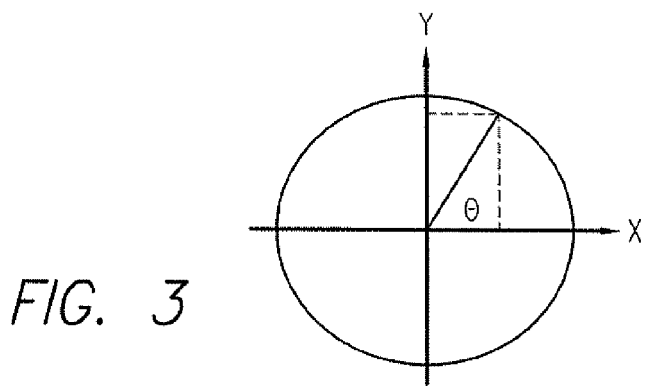
FIG. 3 is a diagram showing the projection of the magnetic field onto the X-Y plane for the motor angle.
Figure 4:
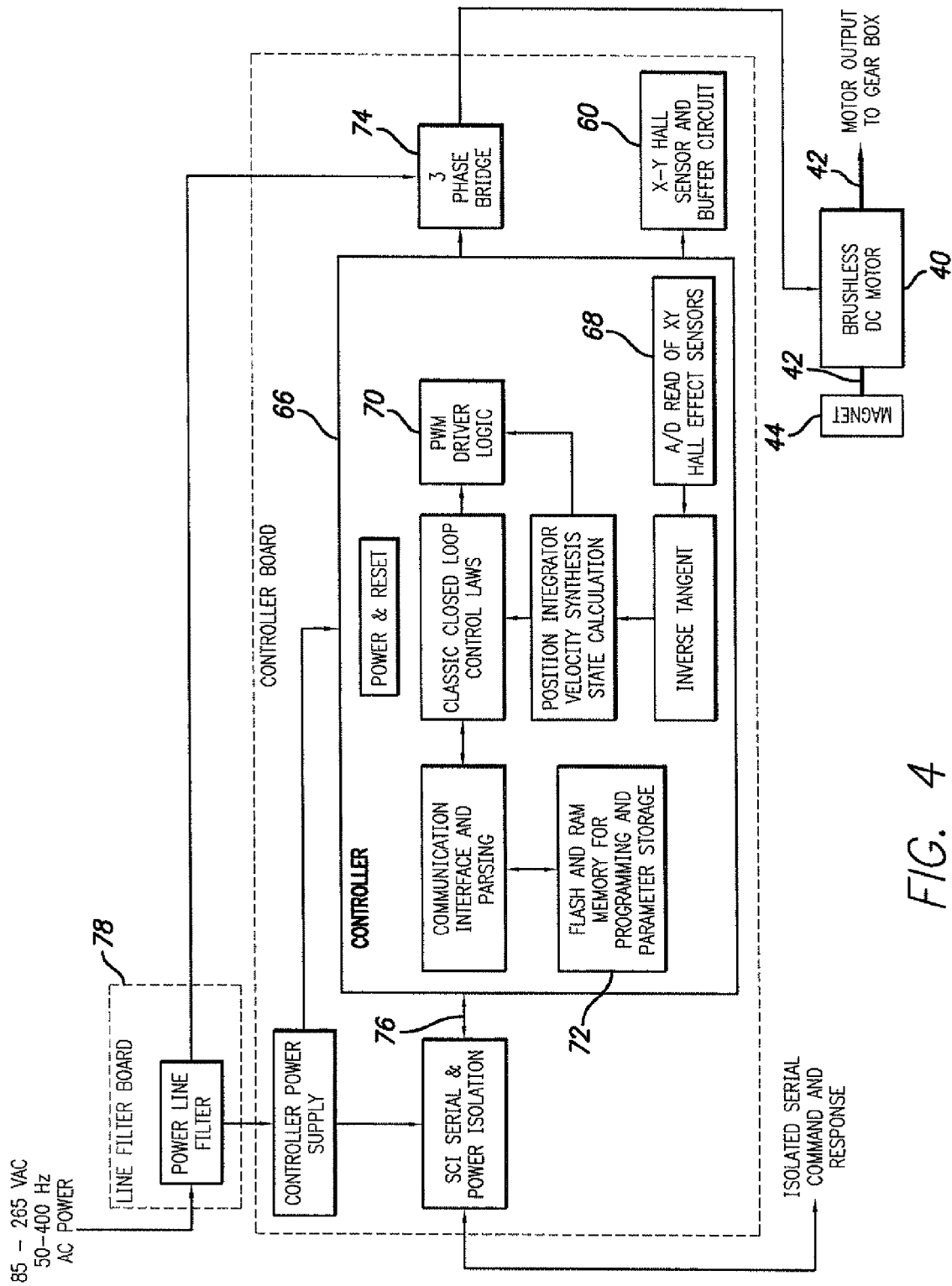
FIG. 4 is a block diagram of the integrated motor and controller.

As the shaft 42 rotates and with it magnet 44 the Hall Effect Sensor 60 as shown in FIG. 2 provides an output which is representative of the Y or Sine component of the magnetic field as shown at 62 and the X or Cosine component which is shown at 64. As shown in FIG. 3 the X-Y signals represent the projections of the rotating magnetic field on a unit circle and the inverse tangent of Y/X will reproduce the motor angle as a value in the controller code. FIG. 4 is a block diagram illustrating the motor and controller functions.

The minimal embodiment of the invention is physically shown in FIG. 1 and depicted in the block diagram of FIG. 2. This configuration has the following key elements.

An electronic controller which is mechanically fixed to one end of the motor directly over the rotor shaft. The rotor shaft is fitted with a concentrically located magnet with a single North and South Pole rotating in the plane that is orthogonal to the axis of motor rotation. The controller circuit is mounted such that an XY Hall Effect Sensor 60, mounted on the board, is located directly over the rotating magnet 44. The output of the XY Hall Effect Sensor represents the Sine 62 and Cosine 64 components of the rotation of the magnet and thus rotor, position.

A controller 66 on the board that contains the highly integrated functions of internal Analog to Digital converters 68, PWM (Pulse Width Modulation) registers 70 for driving the power amplifier, internal communication ports 76, and all of the RAM (Random Access Memory) and FLASH non-volatile memory 72 that is typically required for motor control. The software in the controller provides the command and control interfaces for the user and it computes the control algorithm that provides stable motor performance that accurately follows the external commands. The software uses the FLASH memory to store highly configurable control parameter settings that allow the system to be easily configured to perform a wide variety of servo functions.

The controller reads the X and Y linear outputs of the Hall Effect Sensor and by methods, written in software, decodes the motor angle with reasonable accuracy (i.e. at least within 5 degrees of mechanical rotation). Based on the mechanical angle, the controller computes the electrical motor angle. From the electrical angle, the controller calculates the motor state and executes the commutation logic internally. It then directly drives the power bridge transistors 74 that regulate the current into the appropriate motor windings. Those currents produce the rotor torque that drives the rotor in the correct direction and at the correct speed to follow the external user commands.

The derived motor angle is further integrated to give a position output that may span many motor rotations. The resulting position is used as feedback to the controller to apply torque in the direction that will reduce the error between the externally commanded position and the synthesized position.

Figure 5:
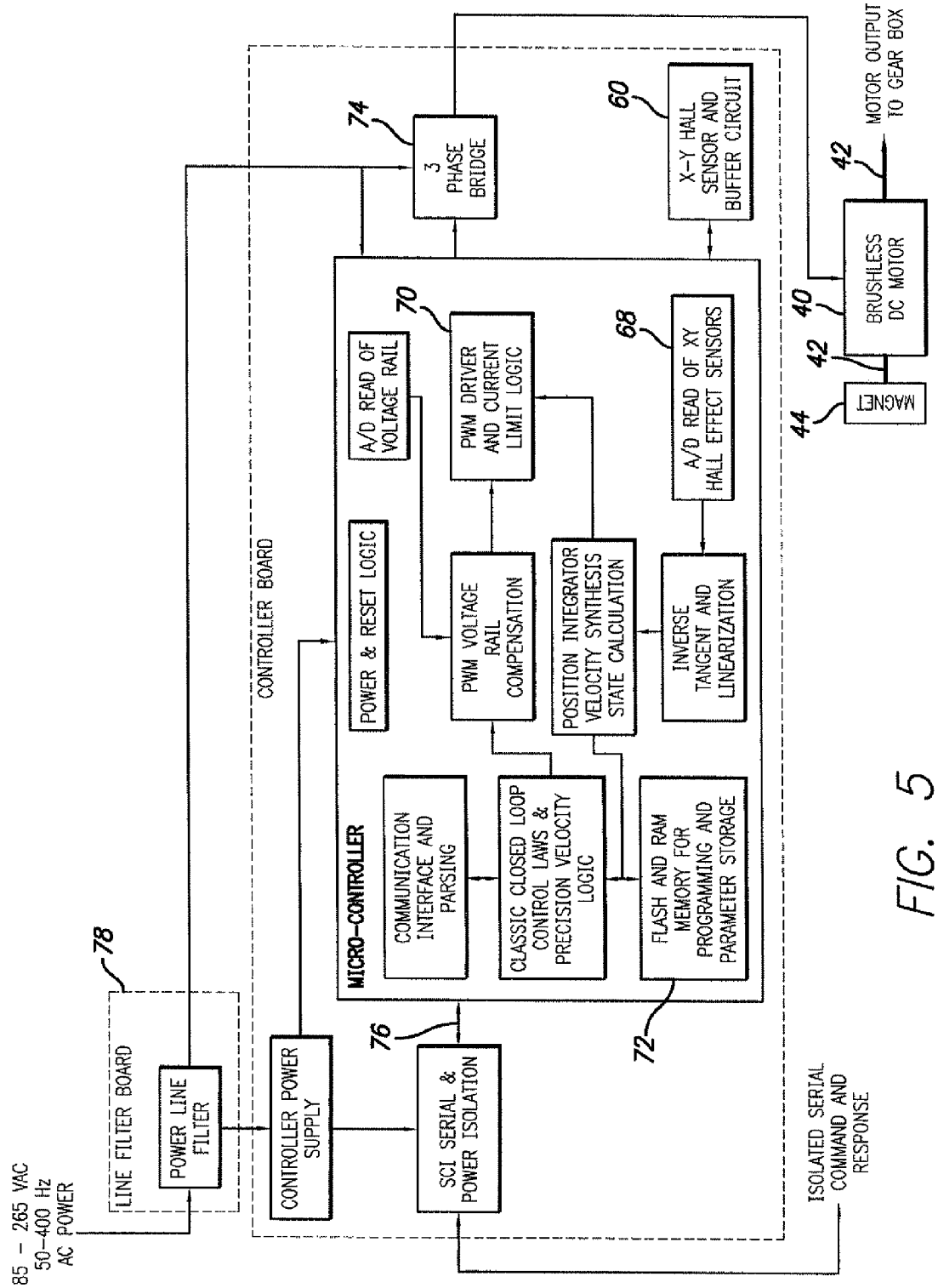
FIG. 5 is a block diagram of the preferred embodiment of the integrated motor controller.

The preferred embodiment of the invention is physically shown in FIG. 1 and is depicted in the block diagram of FIG. 5. This configuration has the following key elements which, in combination, result in a highly versatile, very simple, very reliable, and cost effective design. The same reference numerals will be used for the same components as shown in FIG. 4.

An electronic controller 50 which is mechanically fixed to one end of the motor 40 directly over the rotor shaft 42. The rotor shaft is fitted with a concentrically located magnet 44 with a single North and South Pole rotating in the plane that is orthogonal to the axis of motor rotation. The controller circuit is mounted such that an XY Hall Effect Sensor 60, mounted on the board, is located directly over the rotating magnet. The output of the XY Hall Effect Sensor represents the Sine 62 and Cosine 64 components of the rotation of the magnet, and thus rotor, position.

A controller 66 on the board that contains the highly integrated functions of internal Analog to Digital converters 68, PWM (Pulse Width Modulation) registers 70 for driving the power amplifier, internal communication ports 76, and all of the RAM (Random Access Memory) and FLASH non-volatile memory 72 that is typically required for motor control. The software in the controller provides the command and control interfaces for the user and it computes the control algorithm that provides stable motor performance that accurately follows the external commands. The software uses the FLASH memory to store changeable control parameter settings that allow the system to be easily configured to perform a wide variety of servo functions.

The controller reads the X and Y linear outputs of the Hall Effect Sensor and by methods, written in software, decodes the motor angle with reasonable accuracy (i.e. at least within 5 degrees of mechanical rotation). Based on the mechanical angle, the controller computes the electrical motor angle. From the electrical angle, the controller calculates the motor state and executes the commutation logic internally. It then directly drives the power bridge transistors 74 that regulate the current into the appropriate motor windings. Those currents produce the rotor torque that drives the rotor in the correct direction and at the correct speed to follow the external user commands.

The derived motor angle is further integrated to give a position output that may span many motor rotations. The resulting position is used as feedback to the controller to apply torque in the direction that will reduce the error between the externally commanded position and the synthesized position.

The PWM driver performance is enhanced by the use of a unique modulation scheme that both improves efficiency and resolution for very low duty cycles and makes the introduction of variable PWM modulation frequency easy to accomplish. The variable modulation frequency spreads the spectrum of EMI switching related electromagnetic emissions. This feature improves the conducted emissions numbers by about 10 dB.

The design implements a motor angle linearization technique that requires calibration at the time of production. The algorithm greatly improves the accuracy of Hall Effect Sensor decoded motor angle. This reduces production cost because it removes most of the tolerance criticality for concentricity of the end shaft sensor magnet with respect to the XY Hall Effect Sensor placement. It also reduces the second order contamination of the field measurements from the main motor rotor magnets.

The design further employs a simple bridge rectifier and filter circuit 78 that is capable of accepting a wide range of input power supply characteristics from DC to greater than 400 Hz and an input voltage range up to 265 VAC or 375 VDC.

The broad range of input supply voltage for the motor supply rail is enhanced by the use of line voltage feed forward term in the motor control algorithm. The PWM duty cycle that is calculated from the control algorithm is modified by the reciprocal of the motor rail voltage to normalize the performance of the system over a large voltage range. The use of this method eliminates the need for a difficult current feedback loop in the control calculations.

A sensor-less current limiting method is used to further reduce cost and circuit complexity. The technique involves estimating the required motor PWM to achieve the real time no-load velocity. The PWM allowed is limited to the no load theoretical value plus or minus the value that is required to achieve current limit at zero speed.

Velocity control is greatly enhanced by using a method in which the motor is actually controlled as a position loop. The commanded velocity is used to setup a precise position trajectory that will require the exact commanded velocity. Because the motor will follow the position trajectory with a minimal and bounded steady state error, the velocity of the motor over a period of time, will be as accurate as the crystal oscillator time base in the controller.

The servo loop performance is enhanced by a very high speed inverse tangent function that uses a table look up method. The typical Inverse Tangent method required to get motor angle from the Hall Effect Sensors, is very math intensive and would significantly impact the processor throughput.

A basic requirement of any servo system is that it must have accurate and timely information relating to measured position and velocity of the plant. In this case the plant is the motor and the output is the rotor shaft. The commanded values of position and velocity are compared to the measured values to close a loop which results in the mechanical output following the signal command. This invention uses a single reliable and robust XY Hall Effect Sensor to get all of the necessary system state information to produce a high performance servo system. Because this single sensor does not require wiring between the motor and the controller (it does require close physical proximity) the resulting system has only three electrical wires 32, 34 and 36 (FIG. 22) between the motor and the controller.

As shown in FIGS. 1, 21 and 22 the electronic controller is mechanically fixed to one end of the motor 40 directly over the rotor shaft 42. The rotor shaft 46 is fined with a concentrically located magnet 44 with a single North and South Pole (2 pole magnet). The sensor magnet rotates in the plane that is orthogonal to the axis of motor rotation as shown in FIG. 2. The controller circuit 50 is mounted such that an X-Y Hall Effect Sensor, mounted on the board, is located directly over the rotating magnet at a critical distance that maximizes the analog X and Y outputs while not allowing the field to saturate the two sensors.

As the motor rotor and the sensor magnet rotate, the magnetic field around the sensor magnet rotates, painting a magnetic unit circle as shown in FIG. 3. The X-Y Hall Effect Sensor is directly exposed to this rotating field and is designed to detect two orthogonal components of the field which are referred to as the X and Y outputs. The outputs from this monolithic integrated circuit are analog voltages centered about ½ of the chip power supply voltage and whose magnitude is directly proportional to the component of the field strength that is in the sensors orientation. The analog signals are subsequently read into the controller for processing.

Figure 6:
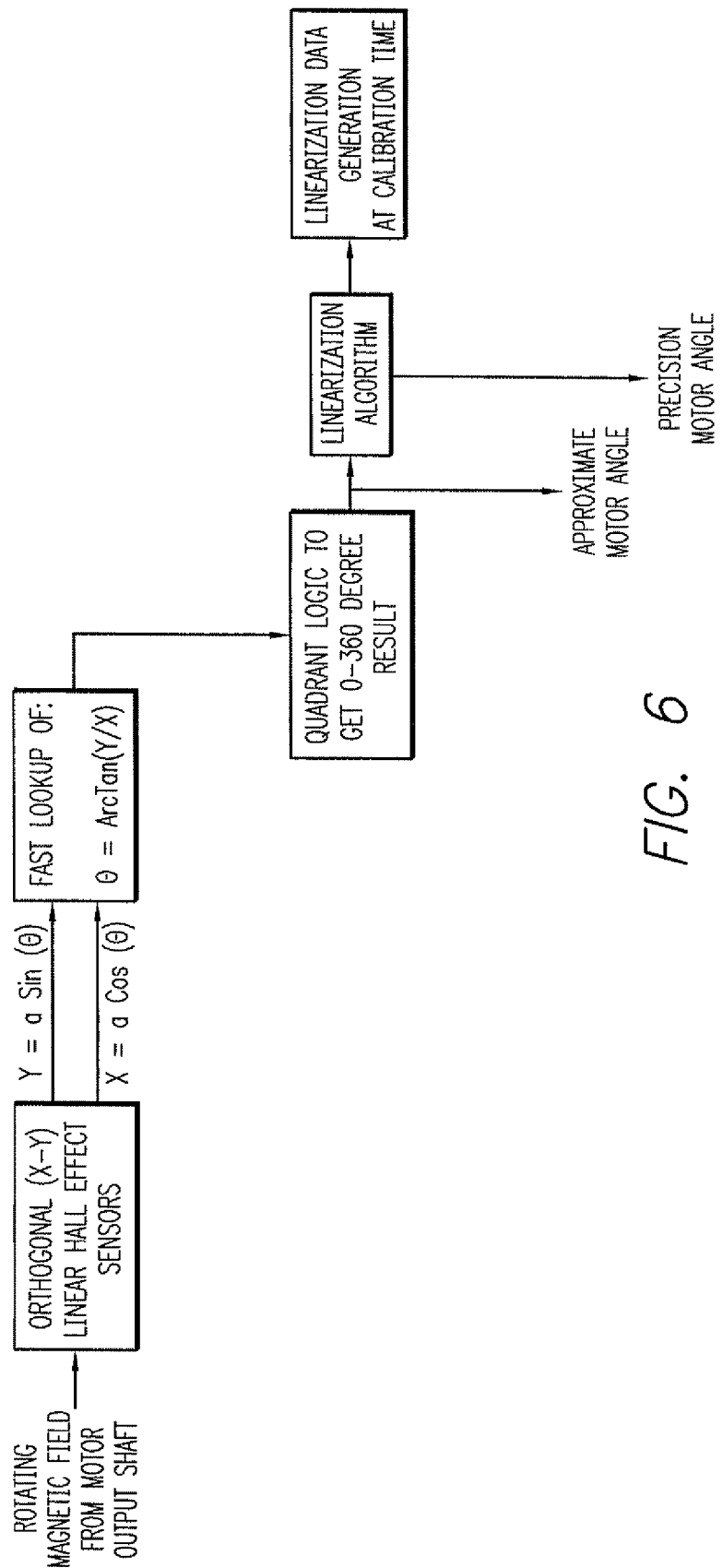
FIG. 6 is a diagram illustrating the termination of the motor angle from the Hall Effect Sensor data.

Because the X and Y signals represent the projections of the rotating magnetic field on the unit circle, the inverse tangent of Y/X will reproduce the motor angle as a value in the controller code. This function is depicted in FIG. 6. The circuit is insensitive to the exact placement of the magnet relative to the sensor because the ratio of Y/X removes the absolute magnitude of the signal from the equation. This makes the sensor very robust and easy to assemble. The exact location of the board is not very sensitive while the general proximity of the board to the motor and sensor magnet is critical to the functionality of the system.

Figure 7:
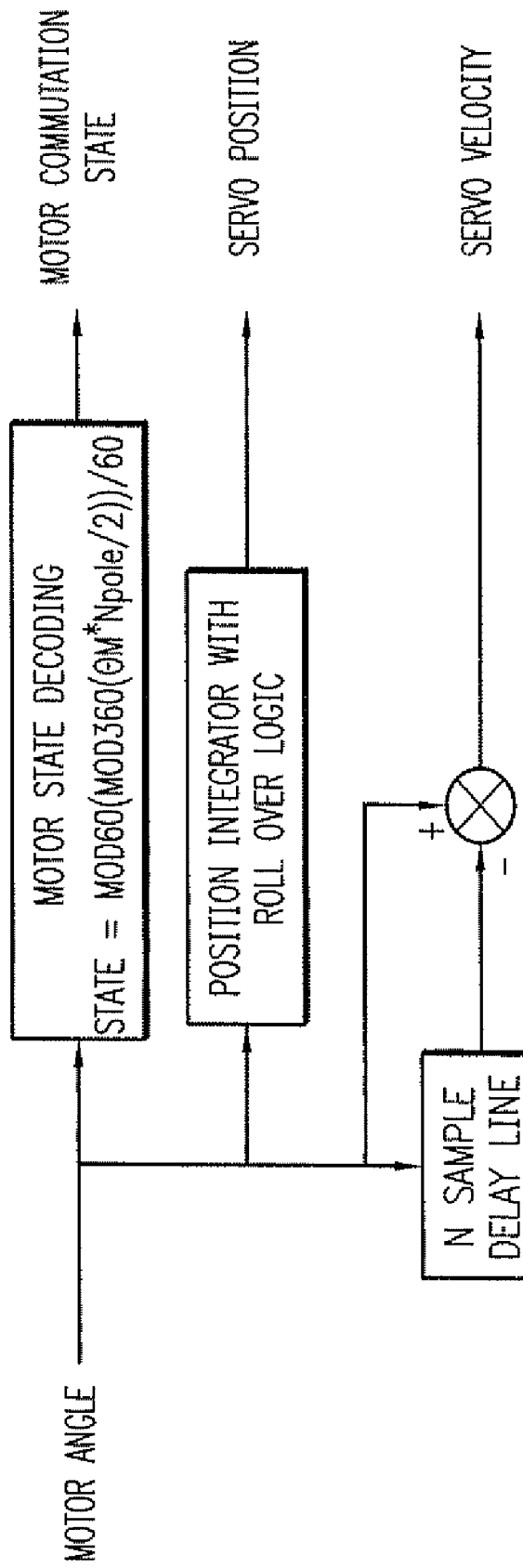
FIG. 7 is a diagram illustrating extraction of the motor state servo position and servo velocity from motor angle.

As seen in FIG. 7, the resulting angle is used to synthesize the motor state, the servo position, and the servo velocity. The servo velocity is simply the difference between the present position and a past position. The time delay from present to the past value that is used is adjustable to allow an optimal trade off between phase lag in the result and signal to noise ratio. Longer delays increase the signal to noise ratio at the expense of greater phase lag. The servo position is simply the integral of the motor position. Both the velocity and the position integral algorithms require some special consideration at the roll over of the motor angle between 360 and 0 degrees.

Figure 20:
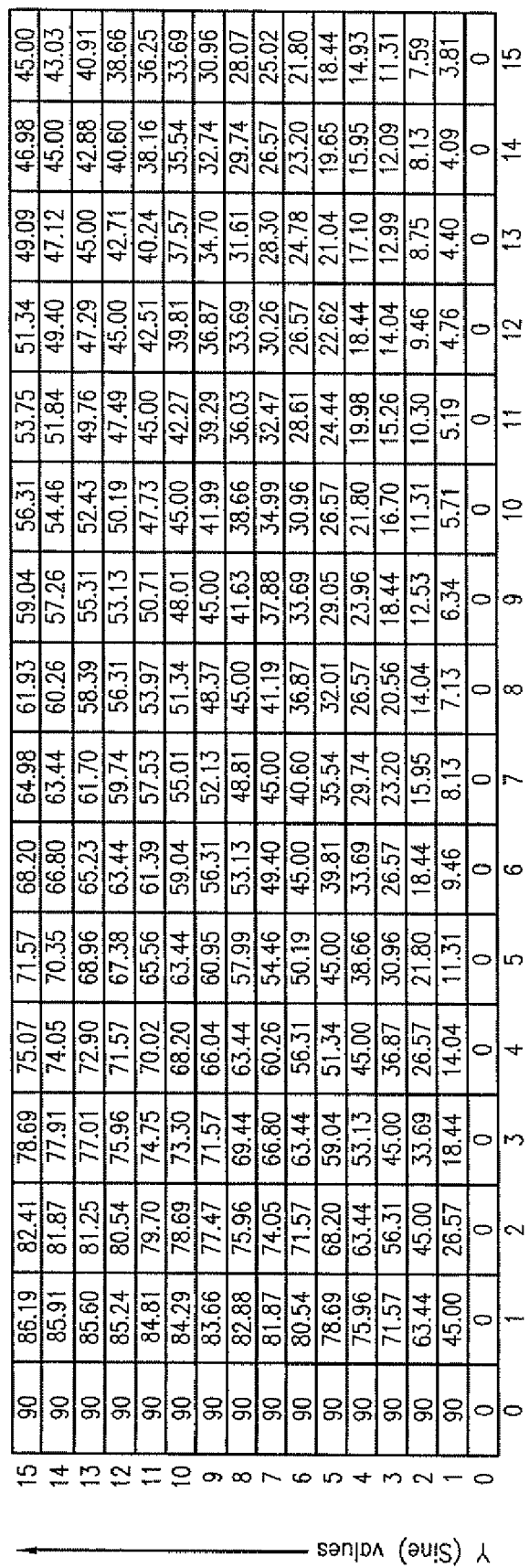
FIG. 20 is a chart showing the look up table data for the Inverse Tangent generated from the output of the X-Y Hall Effect Sensor.

In general, servo loop performance is limited by the processor throughput. The typical Inverse Tangent method, that is required to get motor angle from the Hall Effect Sensors, is very math intensive and significantly impacts the processor throughput. In the preferred embodiment, a very fast look up table method is used. The table is shown in FIG. 20. The table is generated by calculating the angle in the first quadrant of the unit circle for the X and the Y values that serve as indexes into the table. If the table were large enough to encompass all possible values of X and Y from the Analog to Digital Converter 60, the resulting angle for the 1$^{st}$ quadrant would be a direct look up and very fast. This would, however, result in an unacceptably large table. Because the Converter resolution is much higher than the 16 points in the practical size table shown, the following method is used to scale the inputs and linearly interpolate between the points. For a typical controller A to D resolution of +/− 10 bits, the resulting accuracy is within 0.1 degrees.

Step 1—Get the Y table index by taking the absolute value of the raw Y data and shifting the 4 most significant bits down by 6 to get values of 0 to 15. Call it Iy.

Step 2—Get the X table index by taking the absolute value of the raw X data and shifting the 4 most significant bits down by 6 to get values of 0 to 15. Call it Ix.

Step 3—Get the Y remainder as: Ry=|Yraw|−Iy*2^6.

Step 4—Get the X remainder as: Rx=|Xraw|−Ix*2^6.

Step 5—Calculate the Quadrant Angle as: Ang=Tab(Ix,Iy)+[(Tab(Ix,(Iy+1))−Tab(Ix,Iy))*Ry+(Tab((Ix+1),Iy)−Tab(Ix,Iy))*Rx]*2^6.

Step 6—Adjust the angle to the correct for the quadrant by negating the angle for negative Y's and by subsequently subtracting it from 180 degrees for negative X's.

To keep the decoded motor angle accurate, the sensor to sensor magnet alignment would have to be very precise. In addition, the field produced by the sensor magnet would have to be very homogeneous. These are both very difficult to control in production. In the preferred embodiment, this problem is overcome by doing a linearization at calibration. This is done by creating a direct lookup table with the calculated angle being used as the table index and each index location being filled with the calibrated or linearized accurate rotor angle.

FIGS. 12 through 16 show the preferred method for generating the XY linearization table. In this method, the motor is commanded to slowly rotate. At each point in rotation, an external position reference of acceptable accuracy is placed in the corresponding table location that is pointed to (indexed) from the output of the Inverse Tangent algorithm. This is done through multiple rotations to assure that each table index has an entry. If a table location has not been filled, it is filled with the average of the two adjacent values in the table. The resulting table is further filtered using the FIG. 14 algorithm to produce a smooth, continuous, and accurate look up table for output.

Figure 13:
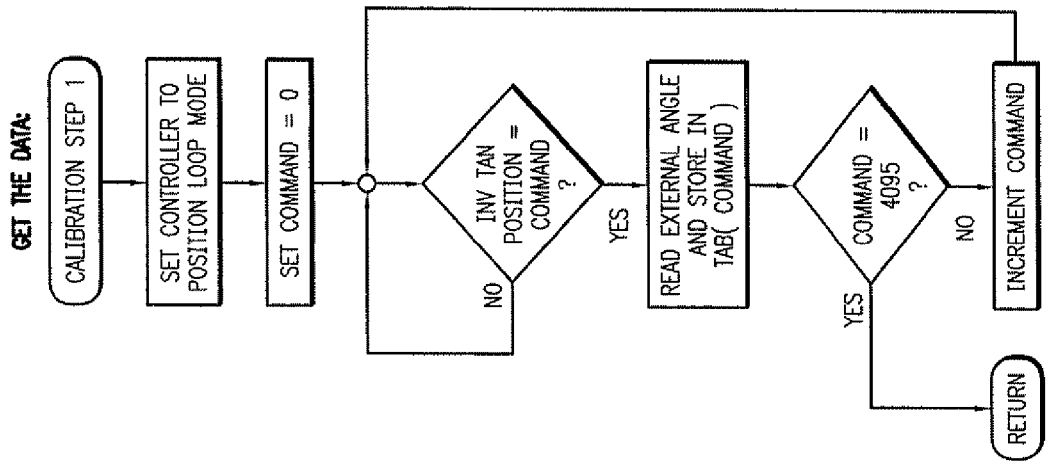
FIGS. 12-16 illustrate the calibration of the controller to match a specific motor assembly at the time of assembly including the computer flow diagrams to generate the data stored in the linearization table.
Figure 12:
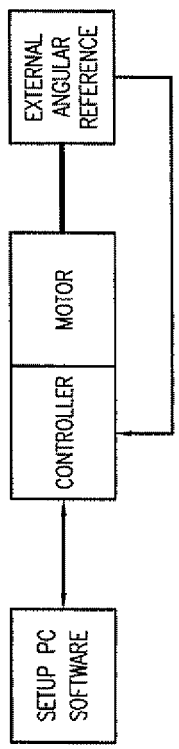
Figure 16:
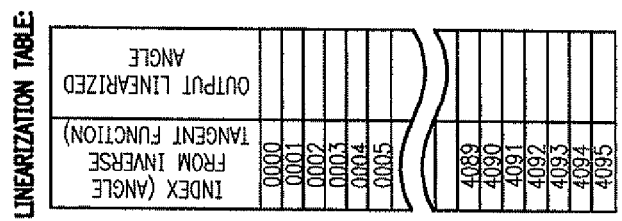
Figure 14:
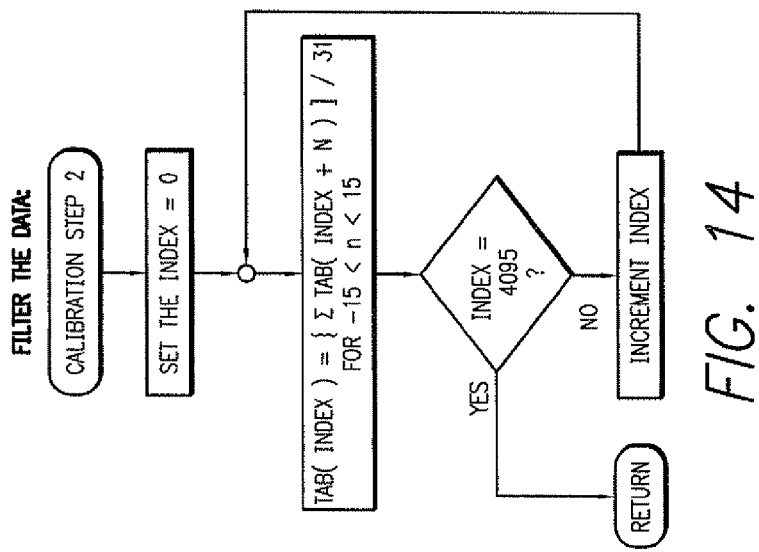
Figure 15:
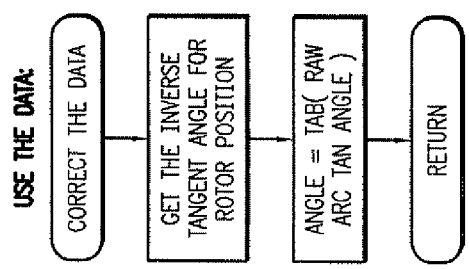

One of the features and limitations of the design is that the sensor magnet on the end of the motor shaft is placed on the shaft in an arbitrary orientation. This greatly eases the assembly process but requires that the controller be calibrated to match a specific motor assembly. The controller software contains a calibration algorithm as shown in FIGS. 13, 14 and 15, that is executed only at the time of assembly to match the controller to the motor.

The algorithm sets a fixed PWM current command to the motor and then steps the motor through a sequence of commutation States to complete one full mechanical rotation. The unloaded motor is known to advance to the zero torque point for each State which is 90 electrical degrees ahead of the center of each State. From this, an average value of offset between the X-Y Hall Sensor absolute position output and the motor State angles can be calculated. At the end of the sequence, the unique offset value is stored into the controller FLASH memory, thus creating a matched set of controller and motor.

An alternate method for doing a linearizing calibration of the X-Y Hall Sensor position calculation has been developed and used for applications that require position accuracy within a mechanical degree or so but do not need it with in the 0.1 degree accuracy that is achievable using the previously disclosed method. In this method, the controller is placed into a Sine drive PWM mode with a fixed PWM duty cycle. The Sine drive uses the PMM circuitry to create a rotating magnetic field in the motor as if a perfect 3 phase AC source were being applied at a very low frequency. Like the commutation calibration method described above, the Sine drive angle command is slowly advanced in 0.1 degree increments causing a very slow and controlled motor rotation. Again, the unloaded motor will advance to a point 90 electrical degrees leading the command to track the zero torque point of the rotation, By recording the relationship between the X-Y Hall position and the open loop commanded position, a one to one mapping is created that gives the X-Y sensor errors which are then compensated for at run time. The accuracy of this method is only limited by the mechanical symmetry of the stator stampings and assembly and by the very minimal motor friction under no-load conditions.

The key advantage of this method is that no external reference or test equipment is necessary to achieve this level of accuracy while allowing very loose production mechanical tolerances.

Referring now to FIG. 21, the physical configuration of the motor and controller is shown with the cover for the controller and power supply removed. As is illustrated in the drawings, the motor 10 has four (4) rods—12, 14, 16 and 18—which extend upwardly from the end 20 of the motor housing. The rods support a controller circuit board 22 positioned adjacent the end 20 of the motor and a power supply circuit board 24 displaced from the controller circuit board 22. A plurality of chips are mounted on the controller circuit board, including a microprocessor, the orthogonally disposed Hall Effect Sensors and additional chips and circuits well known to those skilled in the art that are utilized for motor control. FIG. 22 illustrates the motor from a different position and also shows the brackets—26 and 28—which are used to secure the outer housing for the controller and power supply circuit boards. The motor shaft 30 may also be seen in FIG. 22. It is of particular interest to note that there are only three (3) wires containing control information as shown at 32, 34 and 36, which extend from the controller circuit board 22 to the motor. The construction and operation of the integrated controller motor in accordance with the present invention result in the need for only these 3 wires to transmit the signals to the motor to obtain the desired rotation and position of the shaft 30.

Figures 9, 10:
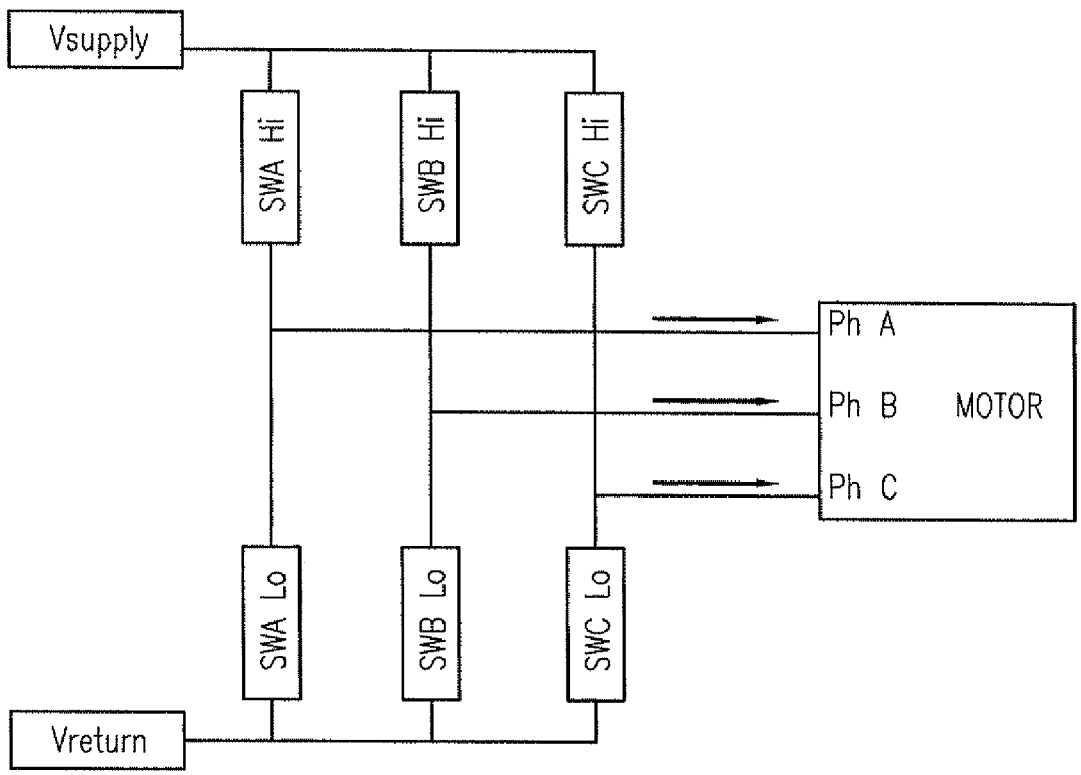
FIG. 9 shows the basic three phase bridge circuit for applying power to the motor.
FIG. 10 is chart showing motor state angles and the motor drive commutation.

The resulting angle from the X-Y sensor is used for all of the servo feedback, including the motor commutation. The brushless DC motor has a three phase winding that is driven by a conventional six transistor bridge as shown in FIG. 9. The typical motor drive scheme involves PWM modulation of the appropriate transistors in one of six states that correspond to 60 degree slices of the 360 degrees of one motor electrical rotation as shown in FIG. 10. A motor has one electrical rotation per pair of rotor poles, so an eight pole motor goes through four electrical rotations per single mechanical rotation. To extract the motor electrical state from the rotor angle, the angle is first corrected for the number of poles as follows:

Electrical Angle=Modulo(Mechanical angle*Npoles/2)

Given the electrical motor angle, the state is found through a simple decision tree in which angles between 0 and 60 degrees is State 1, 60 to 120 degrees is State 2, and so on to State 6 as shown in FIG. 10.

Figure 11A:
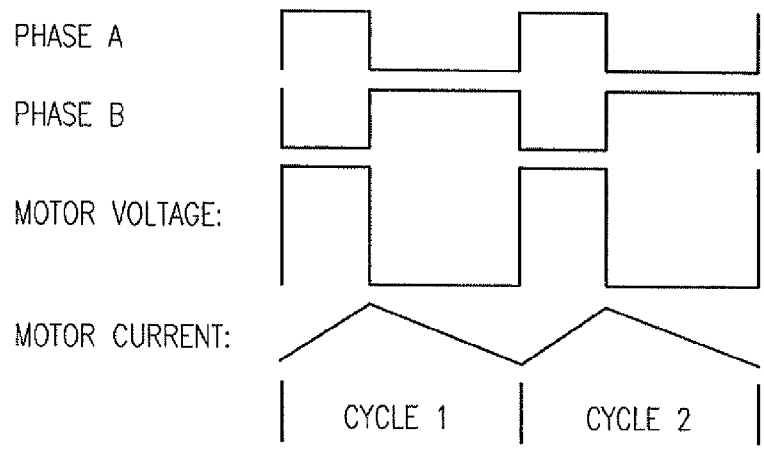
FIG. 11 are waveforms illustrating the pulse with modulation (PWM) switching methods with (A) being the standard prior art for quadrant waveforms with (B) and (C) illustrating differential modulation waveforms.
Figure 11B:
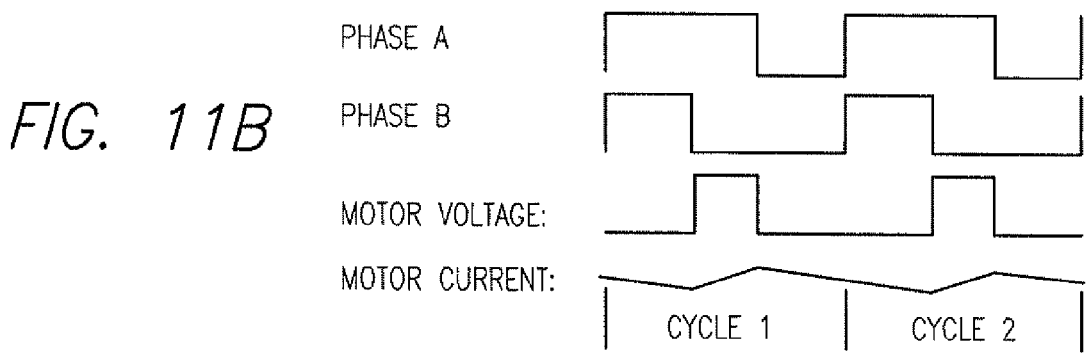
Figure 11C:
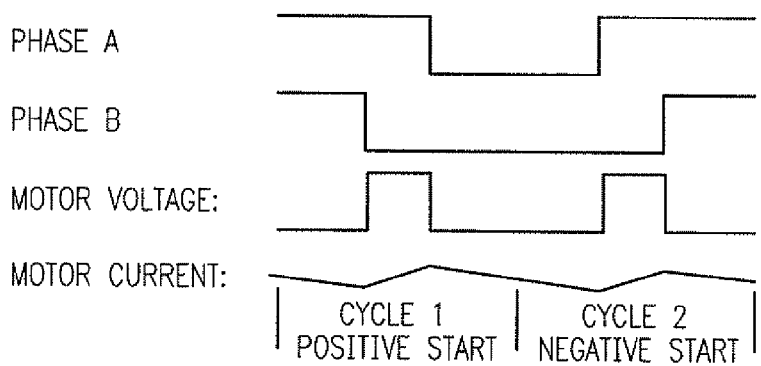

Given the motor electrical state, the appropriate pair of transistors are modulated to control the current in the motor windings. Higher duty cycles (i.e. the time the transistors are on) result in higher motor currents. In the preferred embodiment, the modulation scheme shown in FIG. 11 is used to achieve high resolution, low switching losses, and reduced EMI conducted emissions. The first waveform (A) shows the classic 4 Quadrant PWM method. In this method, two pairs of transistors are switching opposite each other to produce alternating full rail voltages across the motor. This results in high motor current ripple and the basic modulation frequency is fixed. The second waveform (B) is one of two preferred methods. Here the general framing frequency of modulation is fixed, but the transistor pairs are switched at differential times with respect to each other. This method has the following advantages over the classic 4 Quadrant:

- By introducing a differential time shift in the switching, the polarity of voltage across the motor does not have to fully reverse. This greatly reduces current ripple.
- By adding a common mode shift in both of the switching times, the effective PWM frequency may be changed without changing the fundamental framing frequency.
- Because the two switching times are independent, the resolution of modulation can be doubled by using ½ steps where only one of the two signals is changed at a time.

The last waveform (C) is an alternate preferred modulation method which does not reset the two switch states at each framing cycle. By allowing that state to remain into the next cycle and then reversing both the polarity and switching order, the current waveform remains the same while the total number of switching events is cut in half The fundamental framing frequency does not change. The average PWM frequency remains the same, and, the ability to use common mode switch timing, to effectively modulate the fundamental PWM frequency, is intact. The importance of being able to modulate the fundamental PWM switching frequency is that it greatly reduces the conducted EMI characteristics of the controller. The ability to spread the spectrum of the fundamental switching frequency reduces conducted emissions by about 10 dB.

Figure 8:
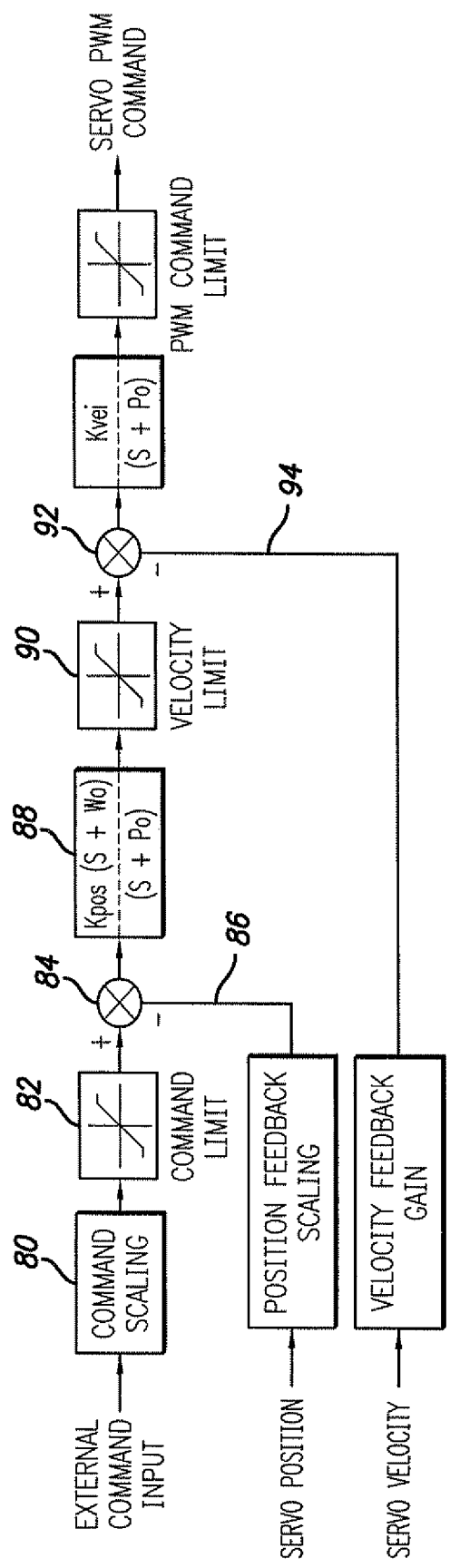
FIG. 8 is a diagram showing the basic loop closure and program flow for position and velocity control loops.

Most of the previously discussed functionality is taking place in software in the controller, which is the heart of the control electronics, as shown in FIGS. 4 and 5. The controller is a highly integrated commercially available device that is designed for motor control applications. The most sophisticated communication to the controller from outside of the system is typically accomplished using a serial communication port, which is an integral part of the processor. The basic servo loop closure takes place, in software within the processor and is expressed in block diagram form in FIG. 8. As can be seen, the external servo command is scaled 80, clamped 82, and then compared 84 to the internally reported motor position 86 to create an error signal. The resulting error is passed through typical control system lag-lead compensation 88, clamped 90 to produce effectively a velocity command. That command is compared 92 to the internally generated velocity signal 94 to result in a motor voltage command. That command, in conjunction with the internally generated motor State information is used to set up the PWM logic that was previously discussed. It should be noted that for a velocity control loop, the position error stage of the block diagram is bypassed.

Because most of the complex functionality actually takes place in the software that is designed for the micro-controller, it follows that important control parameters that will affect system performance can be easily changed to adapt the system to a wide variety of applications. This is done using special commands through the serial communication interface. Key parameters that are easily changed include command and feedback gains for system scaling, command and motor voltage limits, the number of motor poles, etc.

Figure 17:
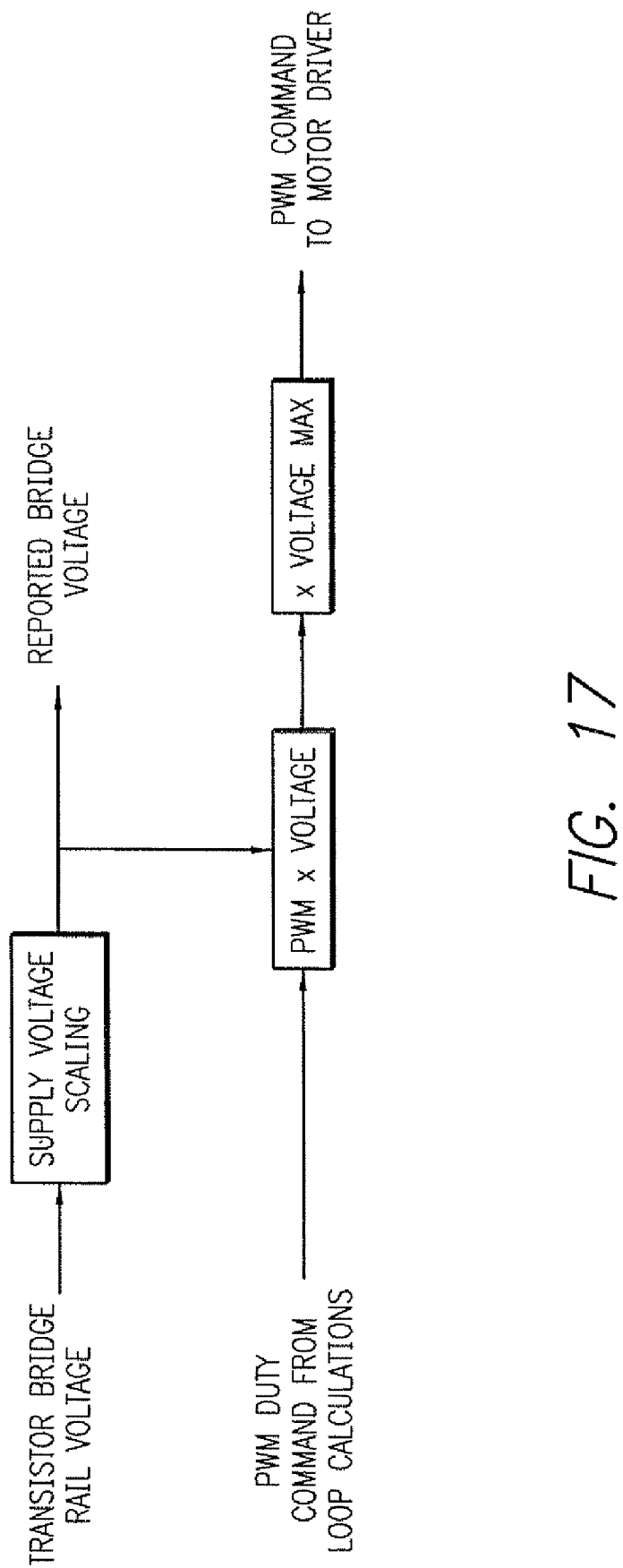
FIG. 17 is a block diagram showing supply voltage feed forward regulation.

In the preferred embodiment, the power supply voltage for driving the motor is delivered by rectifying the AC power mains from the wall outlet and filtering it through capacitors on the DC side of the bridge rectifier. Using this basic method, it is not important that the incoming power supply is AC or DC because it results in a DC bus voltage for motor drive in either case. By properly sizing the switching transistors, the incoming supply may be varied from DC to greater than 400 Hz and over an input voltage range up to 265 VAC or 375 VDC. To accommodate this wide supply voltage range, a feed forward term is introduced that modifies the PWM command, as generated by the control algorithm, before it is processed for motor driving purposes. The block diagram is shown in FIG. 17. The input PWM duty cycle is modified by the reciprocal of the motor rail voltage multiplied by the greatest allowed motor voltage rail. For a given PWM input this maintains a fixed applied motor voltage while the input supply is varied over a range greater than 4 to 1. The use of this method eliminates the need for a very difficult to accurately control current feedback loop in the control calculations.

Figure 18:
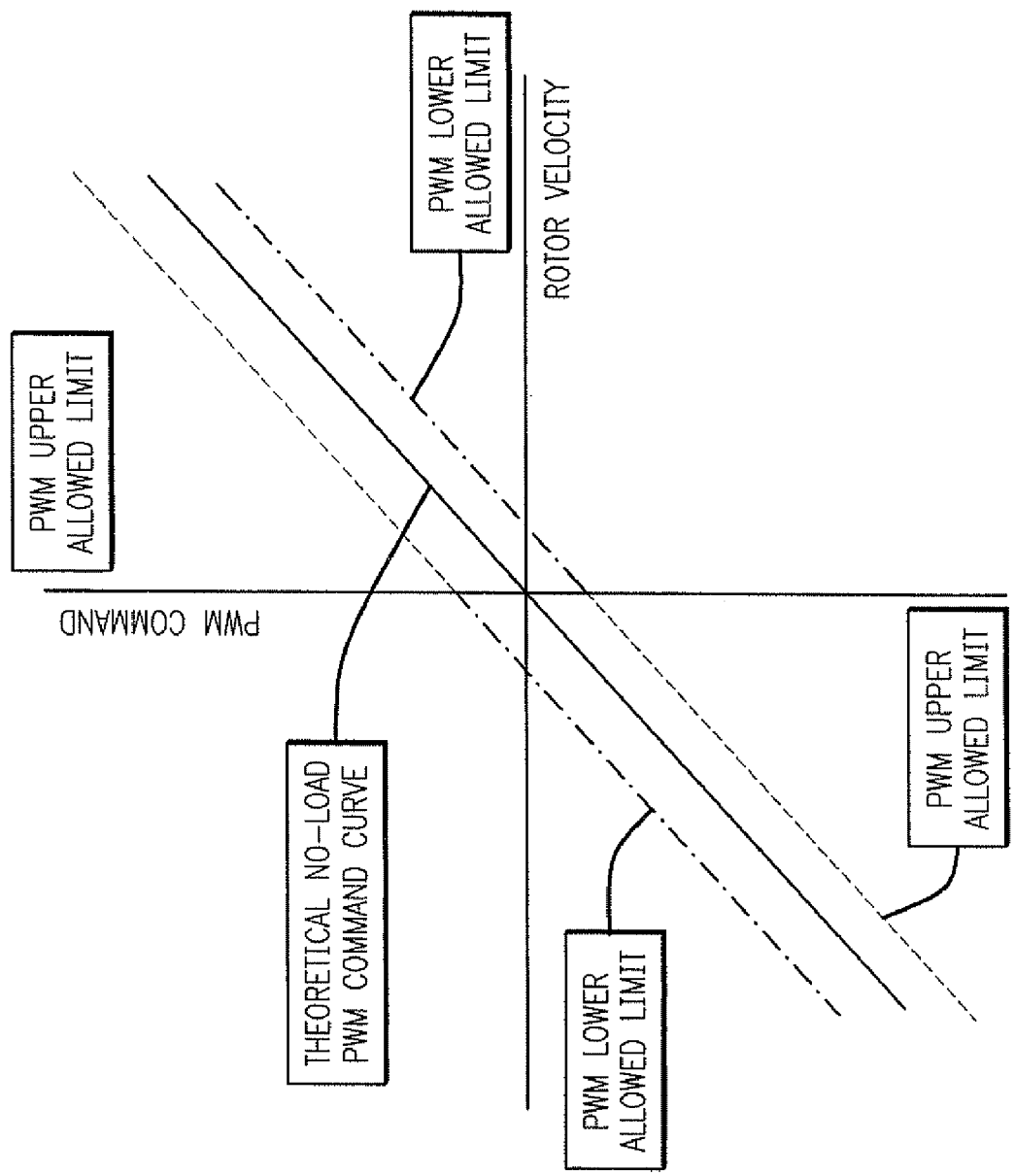
FIG. 18 is a graph showing the sensor-less current limit curve for PWM command limiting.

Typically, servo systems are protected by a current limiting function that prevents excessive currents in the motor and the drive circuitry. The preferred embodiment makes use of a sensor-less current limiting function as shown in FIG. 18. The use of sensor-less current limiting reduces circuit complexity and cost while improving reliability. The concept is to create an allowed boundary for the PWM duty cycle command that is a function of the measured motor velocity. The boundary is created by setting an upper and a lower limit above and below a theoretical line that gives the PWM duty cycle required to achieve the "no-load" velocity. The value of PWM command allowed above and below the theoretical line is determined by:

$$PWM = \text{Current Limit} * \text{Motor Resistance} / \text{Normalized Voltage Rail}$$

A further enhancement of the sensor-less current limiting function, is achieved by allowing transient excursions outside of the boundaries to compensate for the motor electrical time constant. In this variation, the transient magnitude will vary with the dynamics of the system commands, but will always exponentially decay to the boundary values with a time constant that matches, or is slightly faster than, the motor electrical time constant.

Servo systems are commonly required to control the motor speed or velocity rather than an absolute position. As described previously, this may be accomplished using the block diagram of FIG. 8, in which the position error block is bypassed. The command is then scaled, and limited and fed directly into the velocity error summing node. While this method works for most applications, its accuracy is limited by steady state errors in the servo loop and by the accumulation of small errors in the velocity term that is generated for feedback.

Figure 19:
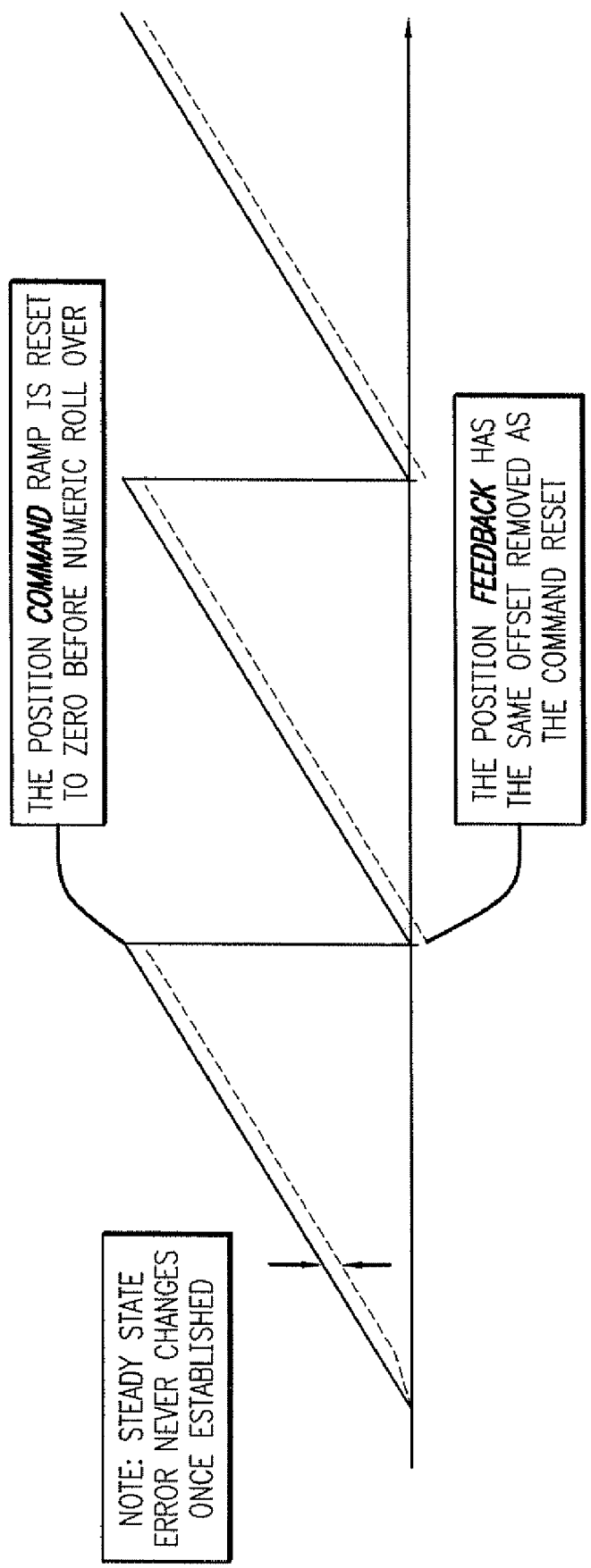
FIG. 19 is a curve showing the precision velocity method waveforms.

The preferred embodiment uses a different technique as shown in FIG. 19. In this method, the servo system is operated in the position loop mode. A position command profile is generated that would be the result of the theoretically perfect velocity which is being commanded. The servo loop follows the position command with some small steady state error, which is typical of stable servo systems. As the revolutions count up, that error remains fixed, regardless of how many revolutions have been made. Consequently, the error in velocity vanishes to zero as operating time moves on. This approach allows the long term accuracy of the velocity to match the accuracy of the oscillator that is running the controller.

To allow the system to operate continuously, a numerical roll over of the increasing position command must eventually be handled. This is accomplished by simply resetting the position command to zero at some limiting point. The feedback position must he reset at the same time to allow smooth continuous operation. To prevent a jerking transient at roll over, the feedback is not reset to zero, but rather has the peak position subtracted from it to preserve the running steady state error.

What is claimed is:

1. An integrated brushless DC motor and controller comprising:
    (A) a brushless direct current motor having a rotating shaft;
    (B) a single two pole permanent magnet affixed on the end of said shaft near the axis of rotation of said shaft for rotation by said shaft in a plane orthogonal to the axis of rotation of said shaft, said two pole permanent magnet being positioned on said shaft in an arbitrary fashion;
    (C) an electronic controller attached to said motor and positioned over said rotating shaft, said electronic controller being matched to said motor at the time of assembly to compensate for said arbitrary positioning of said magnet, said electronic controller being usable only with the motor to which it has been matched;
    (D) a single X-Y Hall Effect Sensor carried by said electronic controller and spaced approximately 0.125 plus or minus 0.25 inches from said two pole permanent magnet to maximize the output signal but to not saturate the sensor, said Hall Effect sensor producing the Sine and Cosine components of the magnetic field as said magnet is rotated by said shaft;
    (E) said electronic controller including means for determining the motor angle and commutation logic from said Sine and Cosine components;
    (F) said motor angle is determined by the inverse tangent of the Sine divided by the Cosine components;
    (G) X-Y Hall Effect sensor errors created by said arbitrary positioning of said permanent magnet are determined by applying a rotating magnetic filed to said motor as a command signal to slowly rotate the motor rotor and decoding the relationship between X-Y Hall Effect position and the command position; and
    (H) only three electrical wires interconnecting said electronic controller to said motor, said wires being secured in place to prevent easy removal of the controller from the motor to which it ahs been matched.

2. An integrated brushless DC motor and controller as defined in claim 1 wherein said electronic controller includes a memory, said memory has a computer program which generates PWM to drive said motor by introducing a differential time shift in the application of electrical power to the stator windings of said motor.

3. An integrated brushless DC motor and controller as defined in claim 2 wherein an offset value between the X-Y Hall Effect Sensor absolute position output ad the motor state angels is generated and stored in said memory in the electronic controller.

4. An integrated brushless DC motor and controller as defined in claim 3 wherein said offset value is generated by applying a fixed PWM current command to the motor and then rotating the rotor through one fully mechanical rotation.

* * * * *